US012050481B1

(12) United States Patent
Hengesbach

(10) Patent No.: US 12,050,481 B1
(45) Date of Patent: Jul. 30, 2024

(54) SYSTEMS FOR KNOB LOCKOUT ON APPLIANCES

(71) Applicant: Haier US Appliance Solutions, Inc., Wilmington, DE (US)

(72) Inventor: Paul Kenneth Hengesbach, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/162,320

(22) Filed: Jan. 31, 2023

(51) Int. Cl.
*F24C 3/12* (2006.01)
*F24C 7/08* (2006.01)
*G05G 1/10* (2006.01)
*G05G 5/00* (2006.01)

(52) U.S. Cl.
CPC ............. *G05G 5/005* (2013.01); *F24C 3/128* (2013.01); *G05G 1/10* (2013.01); *F24C 7/085* (2013.01)

(58) Field of Classification Search
CPC ............ G05G 1/10; F24C 3/128; F24C 7/085
See application file for complete search history.

(56) References Cited

U.S. PATENT DOCUMENTS

| | | | | |
|---|---|---|---|---|
| 4,037,490 | A | 7/1977 | Wilson | |
| 4,300,525 | A * | 11/1981 | Delgado | F24C 3/124 74/567 |
| 5,931,150 | A | 8/1999 | Bowen et al. | |
| 9,684,329 | B2 | 6/2017 | Lawson | |
| 10,114,405 | B2 * | 10/2018 | Swayne | G05G 5/06 |
| 10,579,091 | B2 | 3/2020 | Mendoza | |
| 10,976,767 | B2 | 4/2021 | Swayne et al. | |
| 11,243,556 | B2 | 2/2022 | Bhosale et al. | |
| 11,788,730 | B2 * | 10/2023 | Daufenbach | F24C 3/126 126/1 R |
| 2011/0005508 | A1 * | 1/2011 | Albizuri | F23D 14/46 126/39 E |
| 2020/0300475 | A1 * | 9/2020 | Ibrahim | G05G 1/082 |
| 2021/0239322 | A1 * | 8/2021 | Bang | G05G 5/005 |
| 2021/0272762 | A1 * | 9/2021 | Sato | H01H 13/20 |
| 2021/0286397 | A1 * | 9/2021 | Bhosale | F24C 3/124 |

FOREIGN PATENT DOCUMENTS

| | | | |
|---|---|---|---|
| CA | 2417772 C | 9/2010 | |
| EP | 3628929 A1 * | 4/2020 | F24C 3/12 |

* cited by examiner

*Primary Examiner* — Daniel D Yabut
(74) *Attorney, Agent, or Firm* — Dority & Manning, P.A.

(57) ABSTRACT

A knob assembly for an appliance includes a knob, a bezel, and restrictor block. The restrictor block removably couples within the knob. The restrictor block includes a first mating face that is configured to position adjacent the bezel on the appliance, and a second mating face is configured to position adjacent an inside surface of the knob. The restrictor block also includes a first pin positioned on the first mating face that is configured to restrict rotation of the restrictor block relative to the bezel, as well as a notch in a circumferential portion of the restrictor block. The notch is configured to restrict rotation of the knob relative to the bezel. While the restrictor block is installed within the knob, the knob is rotationally restricted.

18 Claims, 7 Drawing Sheets

SYSTEMS FOR KNOB LOCKOUT ON APPLIANCES

FIELD OF THE INVENTION

The present subject matter relates generally to systems for locking knobs on appliances, particularly non-visibly locking knobs on appliances.

BACKGROUND OF THE INVENTION

Cooktop appliances generally include heating elements for heating cooking utensils, such as pots, pans, and griddles. A user can select a desired heating level, and operation of one or more of the heating elements is modified to match the selected heating level. For example, certain cooktop appliances include electric heating elements. During operation, the cooktop appliance operates the electric heating elements at a predetermined power output corresponding to a selected heating level. As another example, some cooktop appliances include gas burners as heating elements. During operation, the heat output of the gas burner is modulated by adjusting a position of a control valve coupled to the gas burner.

Traditionally, appliance manufacturers display products on show room floors or in stores for customers to examine the appliances before purchase. It would be advantageous for a manufacturer to have an appliance with control knobs that are restrictable from activating any heating elements or burners. However, known methods and devices to restrict control knobs negatively impact the appearance of the appliance.

BRIEF DESCRIPTION OF THE INVENTION

Aspects and advantages of the invention will be set forth in part in the following description, or may be apparent from the description, or may be learned through practice of the invention.

In one example embodiment, a knob assembly for an appliance includes a knob, a bezel, and restrictor block. The restrictor block removably couples within the knob. The restrictor block includes a first mating face that is configured to position adjacent the bezel on the appliance, and a second mating face is configured to position adjacent an inside surface of the knob. The restrictor block also includes a first pin positioned on the first mating face that is configured to restrict rotation of the restrictor block relative to the bezel, as well as a notch in a circumferential portion of the restrictor block. The notch is configured to restrict rotation of the knob relative to the bezel. While the restrictor block is installed within the knob, the knob is rotationally restricted.

In another example embodiment, a cooking appliance includes a heating element positioned at a cooking portion of the cooking appliance, a user interface, and a knob rotatably coupled at a bezel on the appliance. The knob includes a restrictor block configured for restricting rotation of the knob. The restrictor block is removably coupled within the knob. While the restrictor block is installed within the knob, the knob is rotationally restricted.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
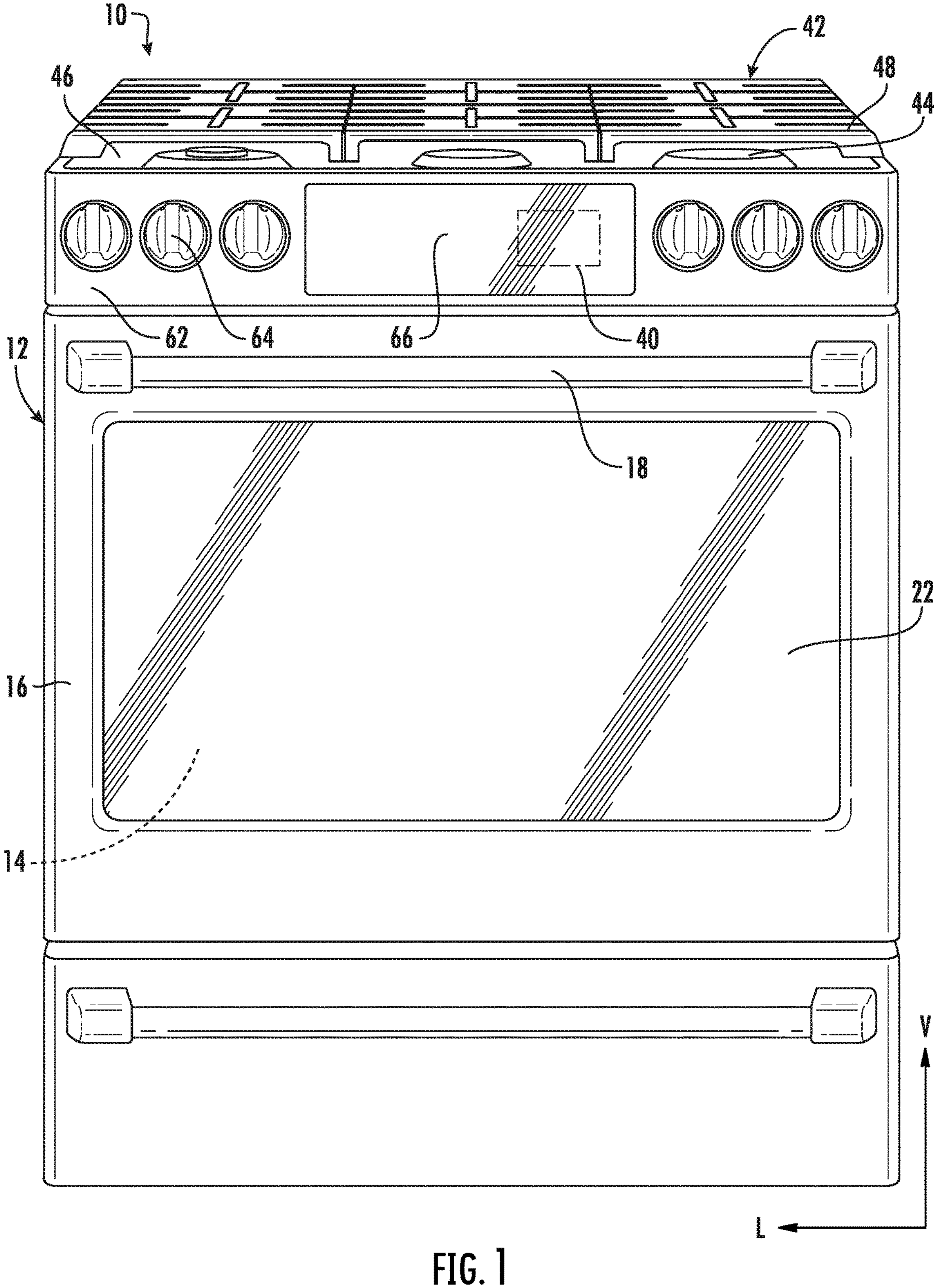
FIG. 1 is a front view of an oven appliance according to an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first,” “second,” and “third” may be used interchangeably to distinguish one component from another and are not intended to signify location or importance of the individual components. The terms “upstream” and “downstream” refer to the relative flow direction with respect to fluid flow in a fluid pathway. For example, “upstream” refers to the flow direction from which the fluid flows, and “downstream” refers to the flow direction to which the fluid flows. The terms “includes” and “including” are intended to be inclusive in a manner similar to the term “comprising.” Similarly, the term “or” is generally intended to be inclusive (i.e., “A or B” is intended to mean “A or B or both”).

Approximating language, as used herein throughout the specification and claims, is applied to modify any quantitative representation that could permissibly vary without resulting in a change in the basic function to which it is related. Accordingly, a value modified by a term or terms, such as “about,” “approximately,” and “substantially,” are not to be limited to the precise value specified. In at least some instances, the approximating language may correspond to the precision of an instrument for measuring the value. For example, the approximating language may refer to being within a ten percent (10%) margin.

Referring now to the figures, FIG. 1 is a front view of a cooking appliance, such as an oven appliance 10, according to an example embodiment of the present disclosure. Generally, the oven appliance 10 defines a vertical direction V, a lateral direction L, and a transverse direction T. The vertical direction V, lateral direction L, and transverse direction T are mutually perpendicular and form an orthogonal direction system. As will be understood, the oven appliance 10 is provided by way of example only, and the present subject matter may be used in any suitable appliance. Thus, the present disclosure may be used with other oven, range, or oven appliance configurations (e.g., configurations that define multiple interior cavities for the receipt of food, include no interior cavities, or are otherwise different than the configuration shown in FIG. 1), as well as other suitable appliances, as would be understood in light of the present disclosure.

The oven appliance 10 includes an insulated cabinet 12 with an interior cooking chamber 14 defined by an interior surface of cabinet 12. The cooking chamber 14 is configured for the receipt of one or more food items to be cooked. The oven appliance 10 includes a door 16 rotatably mounted to cabinet 12 (e.g., with a hinge—not shown). A handle 18 may be mounted to door 16 and may assist a user with opening and closing door 16 in order to access an opening to cooking chamber 14. For example, a user can pull on the handle 18 to open or close door 16 and access cooking chamber 14 through the opening. As would be understood, one or more internal heating elements (e.g., baking or broiling heating elements) may be provided within cooking chamber 14 to cook or otherwise heat items therein.

Further, the oven appliance 10 can include a seal (not shown) between the door 16 and the cabinet 12 that assist with maintaining heat and cooking fumes within cooking chamber 14 when the door 16 is in a closed position, as shown in FIG. 1. One or more parallel glass panes 22 provide for viewing the contents of cooking chamber 14 when door 16 is closed and assist with insulating cooking chamber 14. Optionally, a baking rack (not pictured) is positioned in cooking chamber 14 for the receipt of food items or utensils containing food items.

Moreover, the oven appliance 10 may include a cooktop surface 42 having one or more heating elements 44 for use in heating or cooking operations. In exemplary embodiments, the cooktop surface 42 is comprised of a metal (e.g., steel) panel 46 on which one or more grates 48, described in further detail below, may be supported. In other embodiments, however, the cooktop surface 42 may be constructed of another suitable material, such as a ceramic glass or another suitable non-metallic material. In alternative embodiments, the oven appliance 10 may be a wall oven without the cooktop surface 42.

Further, the heating elements 44 may be various sizes, as shown in FIG. 1, and may employ any suitable method for heating or cooking an object, such as a cooking utensil (not shown), and its contents. In one embodiment, for example, the heating element(s) 44 may use a heat transfer method, such as electric coils or gas burners, to heat the cooking utensil. In another embodiment, however, the heating element(s) 44 uses an induction heating method to heat the cooking utensil directly. In turn, heating element may include a burner element, electric heat element, induction element, or another suitable heating element.

Some embodiments of the oven appliance 10 may further include a controller 40, e.g., configured to control one or more operations of oven appliance 10. For example, the controller 40 may control at least one operation of the oven appliance 10 that includes an internal heating element or cooktop heating element 44 and/or the door 16. As such, the controller 40 may be in communication (e.g., via a suitable wired or wireless connection) with one or more of heating element(s) 44, as well as any other suitable components of the oven appliance 10, as discussed herein. In general, the controller 40 may be operable to configure the oven appliance 10 (and various components thereof) for cooking. Such configuration may be based, for instance, on a plurality of cooking factors of a selected operating cycle or mode.

By way of example, the controller 40 may include one or more memory devices and one or more microprocessors, such as general or special purpose microprocessors operable to execute programming instructions or micro-control code associated with an operating cycle. The memory may represent random access memory such as DRAM, or read only memory such as ROM or FLASH. In one embodiment, the processor executes programming instructions stored in memory. The memory may be a separate component from the processor or may be included onboard within the processor.

In an embodiment, the controller 40 may be positioned in a variety of locations throughout the oven appliance 10. As illustrated, the controller 40 may be located within a user interface 62 of the oven appliance 10. In some such embodiments, input/output ("I/O") signals may be routed between the controller 40 and various operational components of the oven appliance 10, such as the door 16, the heating element(s) 44, control knobs 100, display component 66, sensors, alarms, or other components as may be provided. For instance, signals may be directed along one or more wiring harnesses that may be routed through cabinet 12. In some embodiments, the controller 40 is in communication with the user interface assembly 62 and the control knobs 100 through which a user may select various operational features and modes and monitor progress of the oven appliance 10. In one embodiment, the user interface 62 may represent a general purpose I/O ("GPIO") device or functional block. In another embodiment, the user interface 62 may include input components, such as one or more of a variety of electrical, mechanical, or electro-mechanical input devices including rotary dials, push buttons, and touch pads. Further, the user interface 62 may include a display component 66, such as a digital or analog display configured to provide operational feedback to a user.

Figure 2:
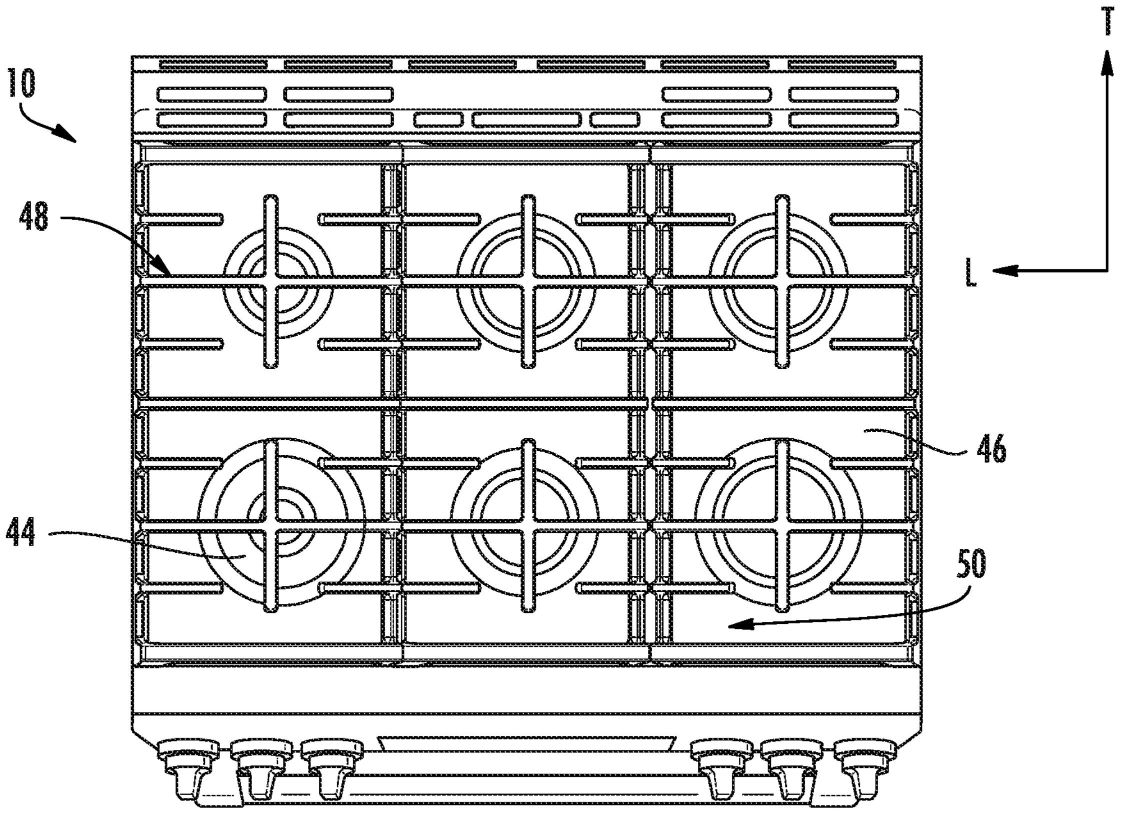
FIG. 2 provides a top view of the example oven appliance of FIG. 1.

Referring now to FIG. 2, a top view of the oven appliance 10 of FIG. 1 is illustrated. As described above, the cooktop surface 42 may include a plurality of heating elements 44 and a panel 46. The panel 46 may be concave (e.g., downward along the vertical direction V) to form a depression or cavity 50 therein. Thus, the heating element(s) 44 may be provided within the cavity 50, and cooking grates 48 may be positioned over top of the heating element(s) 44 (e.g., along the vertical direction V). In this example, the cooktop surface 42 includes six heating elements 44. It should be noted that the disclosure is not limited to this, and the cooktop surface 42 may include fewer or more heating elements 44 as specific applications dictate. In some embodiments, one or more heating elements 44 may be located proximate an edge of panel 46, as will be described in more detail below.

In addition, as shown, the cooktop surface 42 may include one or more cooking grates 48 provided over the heating elements 44. As shown in FIG. 2, for example, the cooktop surface 42 may include three cooking grates 48. It should be noted that the disclosure is not limited to this, and the cooktop surface 42 may include fewer or more cooking grates 48 as specific applications dictate. Each cooking grate 48 may extend from a rear of panel 46 to a front of the panel 46 along the transverse direction. Additionally, or alternatively, the cooking grates 48 may be positioned adjacent to each other along the lateral direction L.

Figure 3:
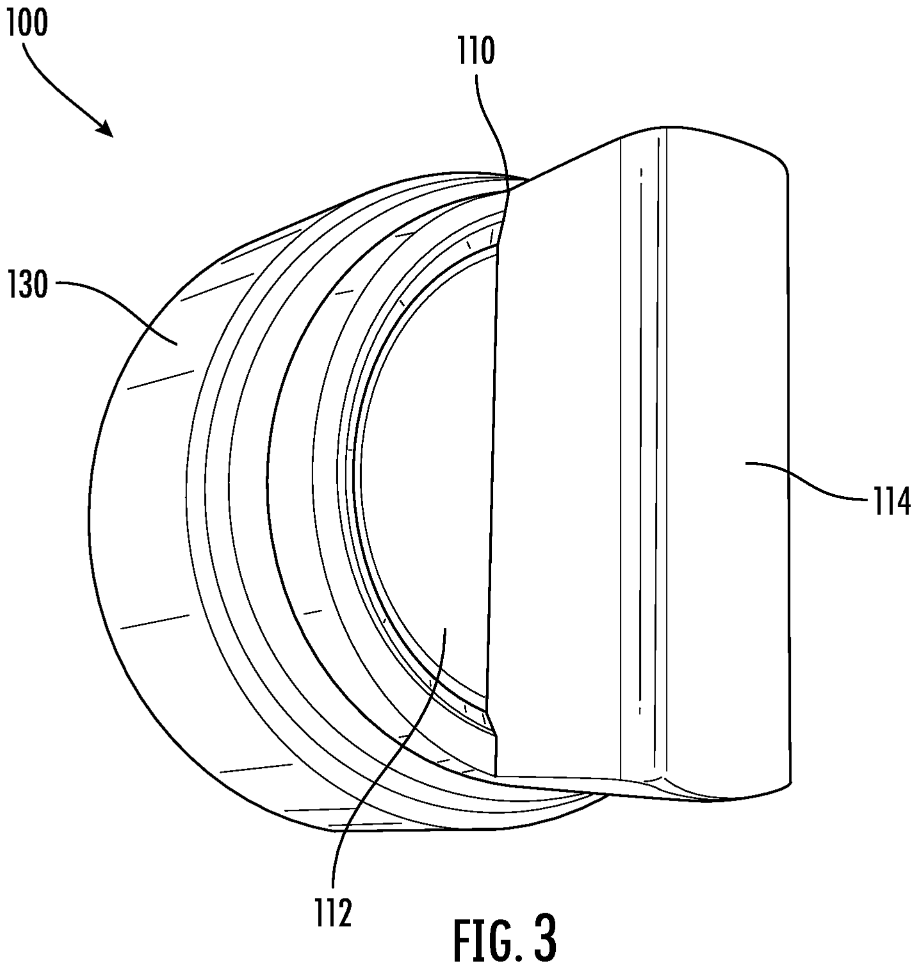
FIG. 3 provides a perspective view of a knob according to an example embodiment of the present subject matter.
Figure 4:
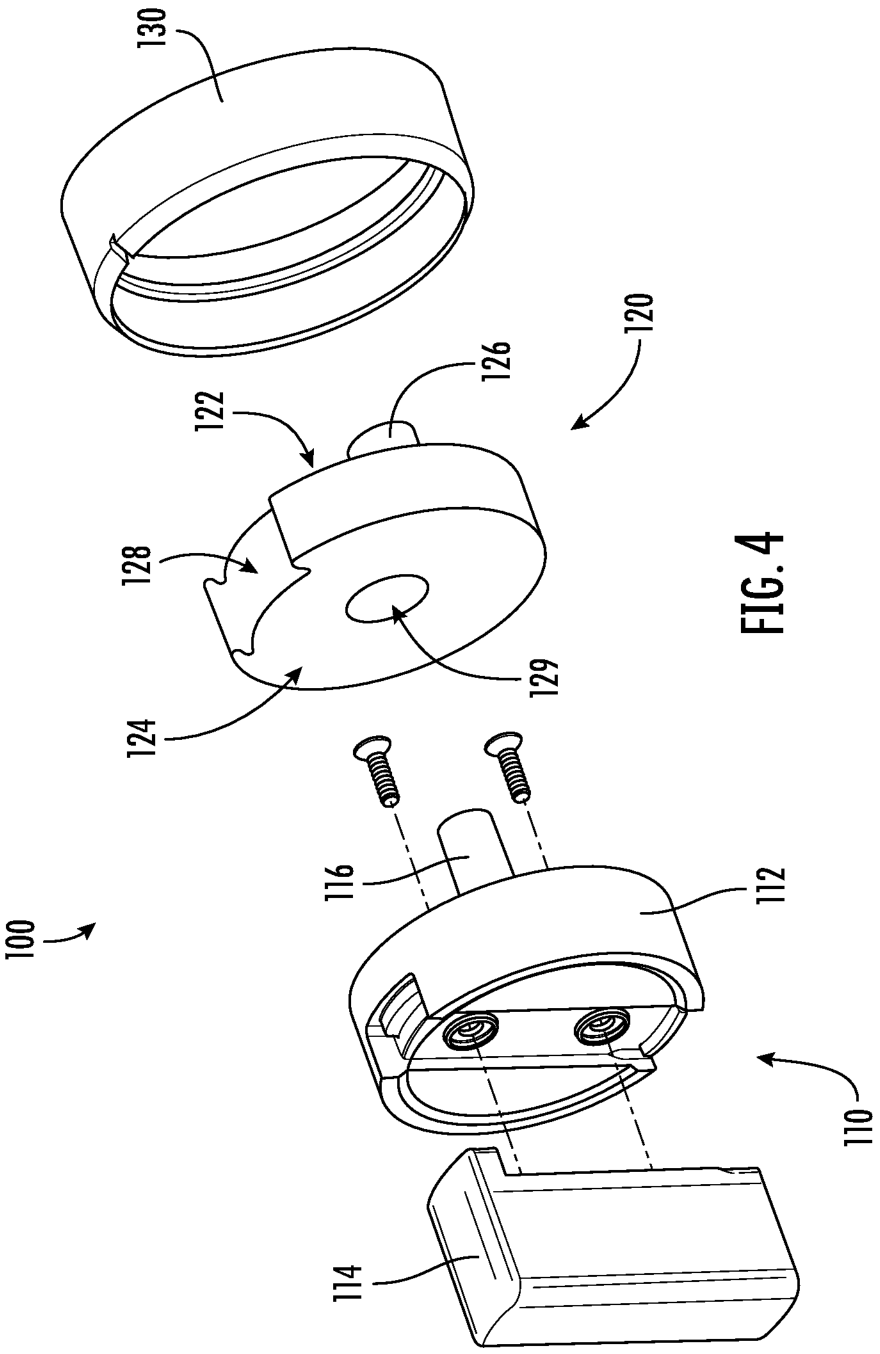
FIG. 4 is an exploded view of the example knob of FIG. 3.

Turning now to FIGS. 3 and 4, a knob 100 according to an example embodiment of the present subject matter will be described in greater detail below. As shown in FIG. 3, knob 100 may include a handle 110. Handle 110 may include a base 112, a blade 114, and a post 116 (FIG. 4). Blade 114 may be mounted to base 112. For example, blade 114 may be fastened, adhered, integrally formed with, etc. to base 112. Thus, e.g., a user may grasp blade 114 to rotate base 112. Base 112 may be cylindrical and include a setting indicia on an outer surface of base 112. When the user rotates base 112 by grasping blade 114, the indicia on base 112 may indicate the operational setting for an associated appliance corresponding to the current rotational position of handle 110. As shown in FIG. 4, post 116 may extend from base 112 and be coupled to a gas valve (not shown) for a gas burner, such as one of heating elements 44. Post 116 may be integrally formed with base 112, e.g., such that post 116 and base 112 are formed from a common piece of material. Thus, the user may adjust the gas valve by rotating handle 110 due to post coupling handle 110 to the gas valve. A bezel 130 may be fixed to cabinet 12, in certain example embodiments, e.g., as with knob 100 shown in FIGS. 3 and 4. In alternative example embodiments, bezel 130 may be rotatable on a cabinet, such as cabinet 12, e.g., as with knob 100.

Knob 100 may also include a restrictor block 120 generally configured for restricting the rotation of knob 100. The restrictor block 120 may be plastic or metal. In general, restrictor block 120 may be configured to removably couple within knob 100, e.g., restrictor block 120 may be inserted within, or between, bezel 130 and base 112. For example, restrictor block 120 may not be visible to a user of oven appliance 10, until knob 100 is disassembled, and restrictor block 120 removed. Thus, restrictor block 120 may be disposed within bezel 130 and base 112 such that restrictor block 120 is not visible to a viewer of knob 100 when knob 100 is in the assembled configuration shown in FIG. 3. Generally, restrictor block 120 may include a first mating face 122 and a second mating face 124. First and second mating surfaces 122, 124 may be positioned opposite each other on restrictor block 120. For example, first mating face 122 may be configured to position adjacent bezel 130 on the user interface 62 of oven appliance 10. Whereas, for example, second mating face 124 may be configured to position adjacent an inside surface, e.g., base 112, of control knob 100.

Figure 5:
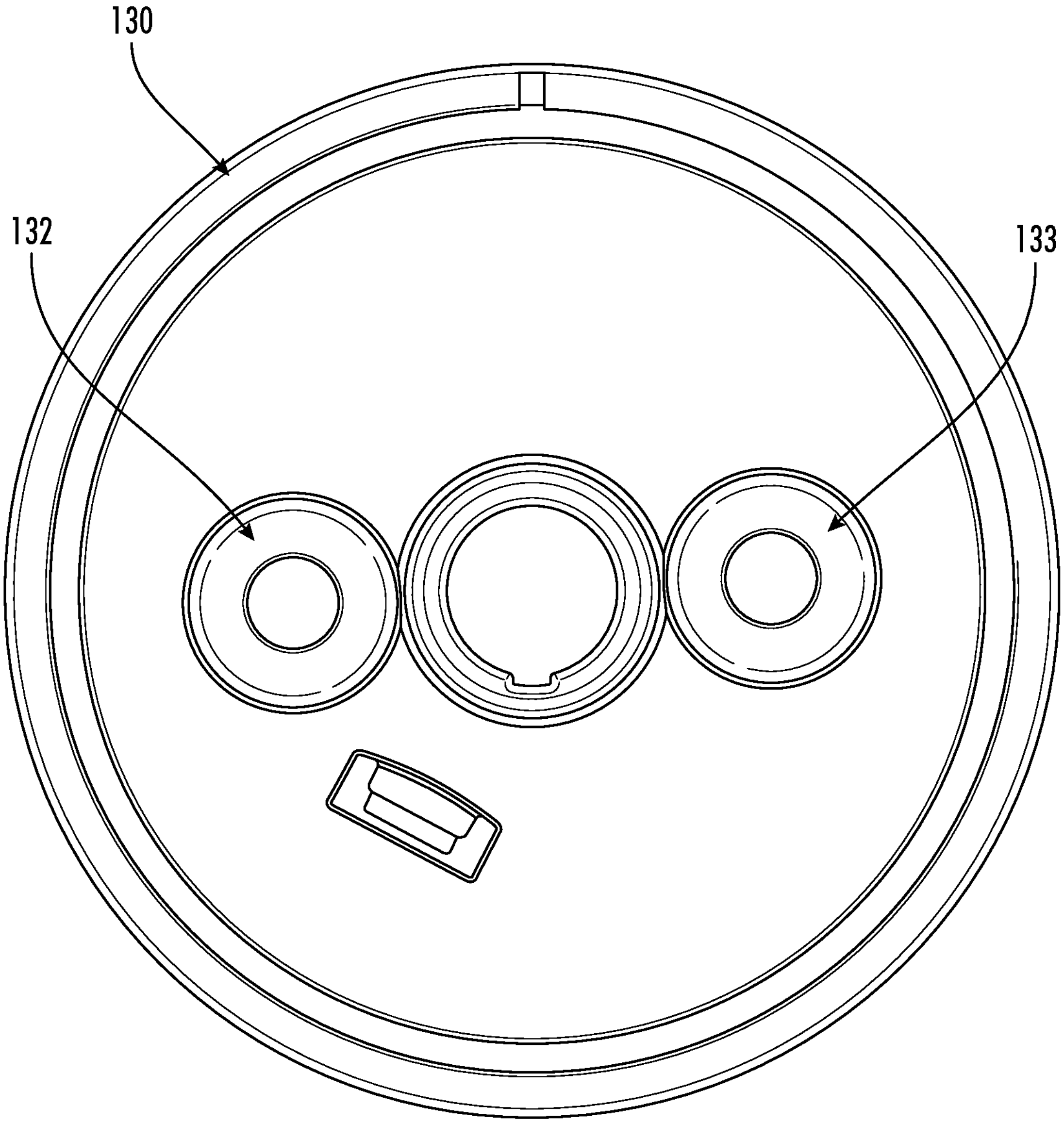
FIG. 5 provides a front view of a bezel according to an example embodiment of the present subject matter.

In general, knob 100 may include at least one pin 126. Specifically, as may be seen in FIG. 7, restrictor block 120 may include two (2) pins 126, e.g., a first pin 126 laterally spaced from a second pin 127. Pin 126 may be generally configured to restrict rotation of the restrictor block 120 relative to the oven appliance 10. Additionally, as may be seen in FIG. 5, bezel 130 may include at least one slot 132. Specifically, as shown in FIG. 5, bezel 130 may include two (2) slots 132, e.g., a first slot 132 and a second slot 133. Generally, pins 126, 127 may be configured to be received within and engage within slots 132, 136 to order to restrict the rotation of restrictor block 120. In other example embodiments, slots 132, 136 may be disposed on other suitable surfaces or portions of oven appliance 10, e.g., user interface 62.

Figure 6:
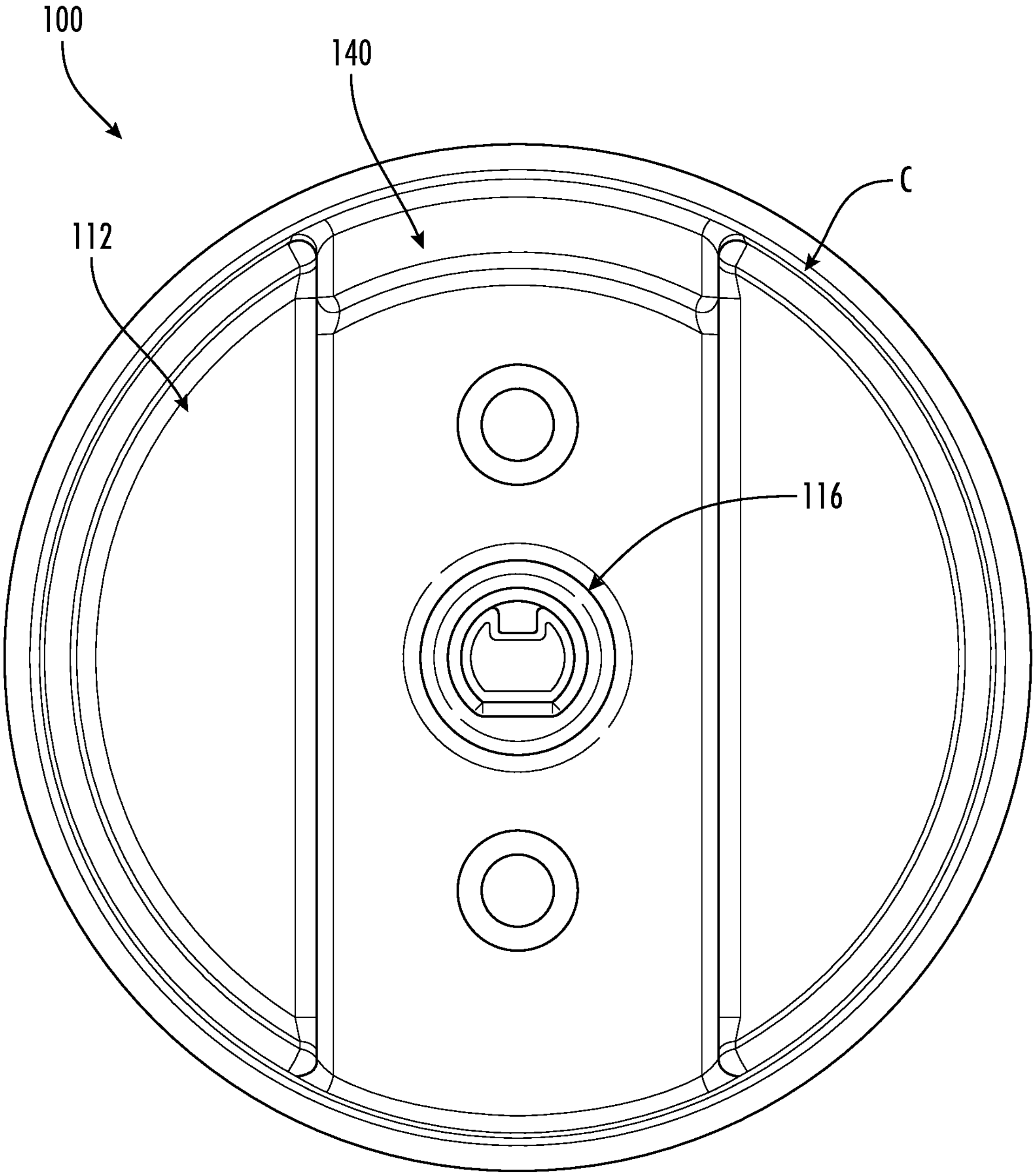
FIG. 6 provides a rear view of the example knob of FIG. 3.

In general, restrictor block 120 may include a notch 128. As may be seen in FIG. 4, Notch 128 may be positioned at and extend along the circumference of restrictor block 120. Notch 128 may be generally configured to engaging with knob 100 in order to restrict the rotation of knob 100 relative to restrictor block 120. Particularly, FIG. 6 provides a rear view of knob 100, where a tab 140 may extend from base 112 of knob 100. In general, tab 140 may extend from a circumferential portion C of knob 100. Generally, circumferential portion C may be any suitable portion of knob 100 such as a perimeter of outer edge of knob 100. More specifically, for example, the tab 140 may engage with notch 128 of restrictor block in order to restrict the rotation of knob 100 relative to restrictor block 120. For example, tab 140 and notch 128 may have about the same circumferential width, e.g., such that tab 140 engages both sides of notch 128 when tab 140 is received within notch 128. In this regard, the rotation of restrictor block 120 may be restricted relative to oven appliance 10, and the rotation of knob 100 may be restricted relative to restrictor block 120, thus rotationally restricting knob 100, e.g., such that knob 100 is rotatable by less than five degrees (5°), such as no less than three degrees (3°), such as about zero degrees (0°).

Figure 7:
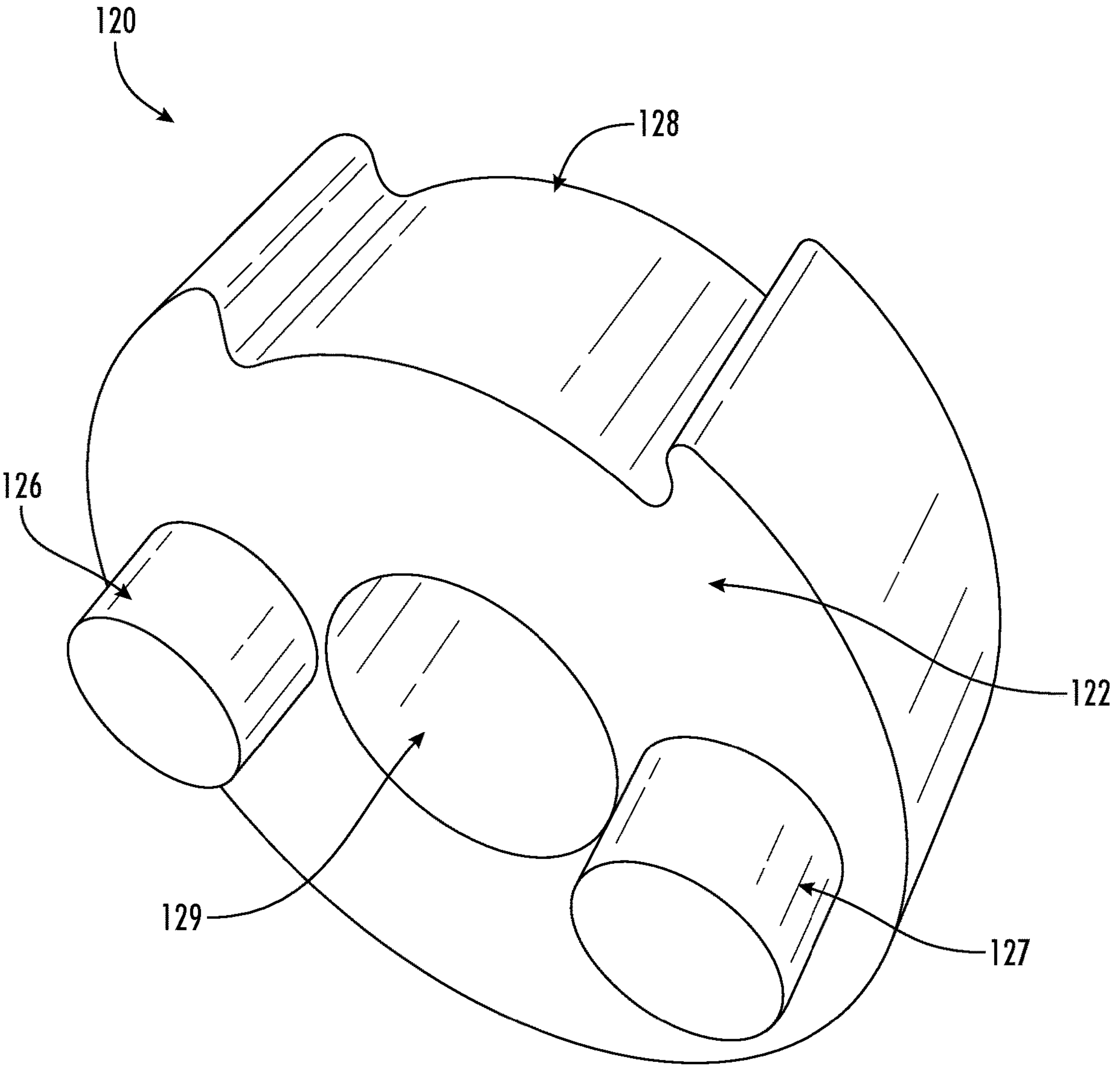
FIG. 7 provides a perspective view of an example restrictor block according to an example embodiment of the present subject matter.

As may be seen in FIG. 7, in general, a hole 129 may extend between first mating face 122 and second mating face 124 of restrictor block 120. Hole 129 may be generally configured to receive post 116 of knob 100, e.g., post 116 may extend from base 112, through hole 129 of restrictor block 120, and be coupled to a gas valve (not shown) for a gas burner, such as one of heating elements 44. Specifically, across first mating face 122, first pin 126 may be laterally spaced from second pin 127 and hole 129 may extend from the second mating face 124 to the first mating face 122 between pins 126, 127. In some example embodiments, hole 129 may be centralized with respect to the overall circumference of the restrictor block 120.

As may be seen from the above, an oven appliance 10 may include a knob 100 with a restrictor block 120 to restrict the rotation of knob 100. Restrictor block 120 may be removed from knob 100 in order to use knob 100 to control oven appliance 10. One of skill in the art would understand and appreciate that the present disclosure may be applied to any suitable appliance with control knobs, such as knob 100. Restrictor block 120 permits a user to restrict the rotation of knob 100 without compromising the appearance of the appliance. Additionally, restrictor block 120 may be installed into knob 100 of oven appliance 10 without the use of additional tools.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A knob assembly for an appliance, comprising:
a knob;
a bezel; and
a restrictor block removably couplable within the knob, the restrictor block comprising,
a first mating face positioned adjacent the bezel,
a second mating face positioned adjacent an inside surface of the knob,
a first pin positioned on and extending away from the first mating face;
a second pin, laterally spaced from the first pin, extending away from the first mating face, the first pin and the second pin configured to restrict rotation of the restrictor block relative to the bezel; and
a notch in a circumferential portion of the restrictor block, the notch configured to restrict rotation of the knob relative to the bezel,
wherein, while the restrictor block is installed within the knob, the knob is rotationally restricted relative to the bezel.

2. The knob assembly of claim 1, wherein the restrictor block is one of plastic or metal.

3. The knob assembly of claim 1, further comprising a hole extending between the first mating face and second mating face.

4. The knob assembly of claim 3, wherein the hole is configured to receive a portion of the knob.

5. The knob assembly of claim 1, wherein the bezel of the appliance comprises a first slot and a second slot configured for receiving the first pin and the second pin, respectively, of the restrictor block.

6. The knob assembly of claim 1, wherein the knob of the appliance comprises a tab configured for engaging with the notch of the restrictor block.

7. The knob assembly of claim 1, wherein the bezel conceals the circumferential portion of the restrictor block.

8. The knob assembly of claim 7, wherein the knob conceals the second mating face of the restrictor block.

9. The knob assembly of claim 8, wherein the restrictor block is non-visible while installed within the knob and the bezel of the appliance.

10. A cooking appliance, comprising:
a heating element positioned at a cooking portion of the cooking appliance;
a user interface;
a knob rotatably couplable at a bezel on the appliance, the knob comprising a restrictor block configured for restricting rotation of the knob, the restrictor block removably couplable within the knob, the restrictor block comprising:
a first mating face positioned adjacent the bezel on the appliance;
a second mating face positioned adjacent an inside surface of the knob;
a first pin positioned on and extending away from the first mating face;
a second pin, laterally spaced from the first pin, and extending away from the first mating face, the first pin and the second pin configured to restrict rotation of the restrictor block relative to the bezel,
wherein while the restrictor block is installed within the knob, the knob is rotationally restricted.

11. The cooking appliance of claim 10, wherein the restrictor block comprises
a notch in a top portion of the restrictor block, the notch configured to restrict rotation of the knob relative to the appliance.

12. The cooking appliance of claim 11, further comprising a hole extending between the first mating face and second mating face.

13. The cooking appliance of claim 12, wherein the hole is configured to receive a portion of the knob.

14. The cooking appliance of claim 11, wherein the bezel of the appliance comprises a first slot and a second slot configured for receiving the first pin and the second pin, respectively, of the restrictor block.

15. The cooking appliance of claim 11, wherein the knob of the appliance comprises a tab configured for engaging with the notch of the restrictor block.

16. The cooking appliance of claim 11, wherein the bezel conceals a circumferential portion of the restrictor block.

17. The cooking appliance of claim 16, wherein the knob conceals the second mating face of the restrictor block.

18. The cooking appliance of claim 17, wherein the restrictor block is non-visible while installed within the knob and the bezel of the appliance.

* * * * *